(12) United States Patent
Mochizuki

(10) Patent No.: US 12,275,345 B2
(45) Date of Patent: Apr. 15, 2025

(54) VEHICLE LAMP

(71) Applicant: MURAKAMI CORPORATION, Shizuoka (JP)

(72) Inventor: Yusuke Mochizuki, Shizuoka (JP)

(73) Assignee: MURAKAMI CORPORATION, Shizuoka (JP)

( * ) Notice: Subject to any disclaimer, the term of this patent is extended or adjusted under 35 U.S.C. 154(b) by 0 days.

(21) Appl. No.: 18/638,804

(22) Filed: Apr. 18, 2024

(65) Prior Publication Data
US 2024/0359619 A1    Oct. 31, 2024

(30) Foreign Application Priority Data

Apr. 25, 2023   (JP) ................................. 2023-071888

(51) Int. Cl.
| | | |
|---|---|---|
| B60Q 1/24 | (2006.01) | |
| F21S 41/19 | (2018.01) | |
| F21S 41/25 | (2018.01) | |
| F21S 41/365 | (2018.01) | |

(52) U.S. Cl.
CPC ............ B60Q 1/247 (2022.05); F21S 41/192 (2018.01); F21S 41/25 (2018.01); F21S 41/365 (2018.01); B60Q 2400/40 (2013.01)

(58) Field of Classification Search
CPC ... B60Q 1/247; B60Q 2400/40; F21S 41/192; F21S 41/25; F21S 41/365
See application file for complete search history.

(56) References Cited

U.S. PATENT DOCUMENTS

| | | | |
|---|---|---|---|
| 6,033,078 A * | 3/2000 | Su ............................ | B60R 1/10 |
| | | | 359/850 |
| 10,179,534 B2 | 1/2019 | Hoshino | |
| 2015/0203026 A1* | 7/2015 | Schotanus ............ | B60Q 1/2615 |
| | | | 362/520 |
| 2018/0154819 A1 | 6/2018 | Hoshino | |

FOREIGN PATENT DOCUMENTS

JP    2018-90191    6/2018

OTHER PUBLICATIONS

2023 BMW 3 Series Owner's Manual, posted on Aug. 23, 2022.

* cited by examiner

*Primary Examiner* — Elmito Breval
(74) *Attorney, Agent, or Firm* — GREENBLUM & BERNSTEIN, P.L.C.

(57) ABSTRACT

A vehicle lamp for a vehicle includes a housing, and an optical system that is housed in the housing and generates image light. The housing includes a window in a partial area of a wall face of the housing. The optical system includes a lens group that generates the image light, an optical path bending mirror that bends an optical path of the generated image light, and a concave mirror that reflects the image light with the optical path bent and emits the image light to an external space from the window. In a state in which the vehicle lamp for a vehicle is installed on the vehicle, the concave mirror is disposed up to a position higher than the window.

8 Claims, 13 Drawing Sheets

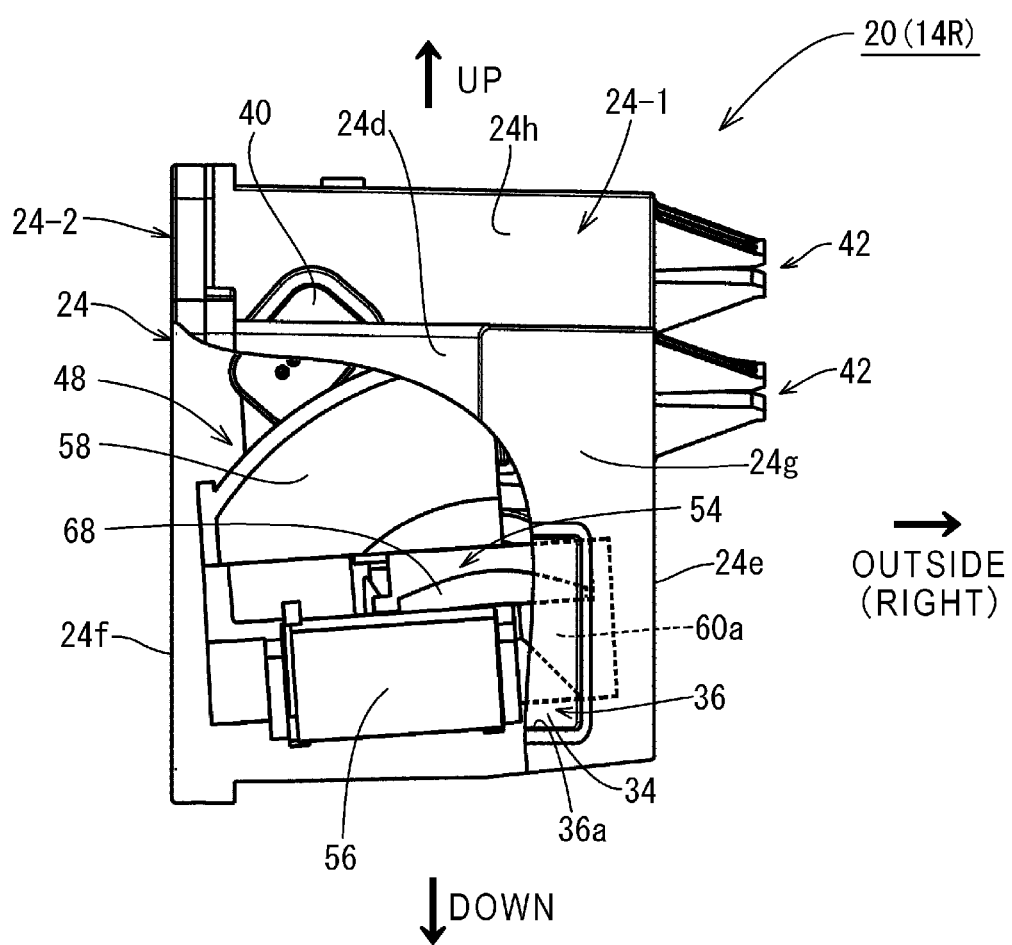

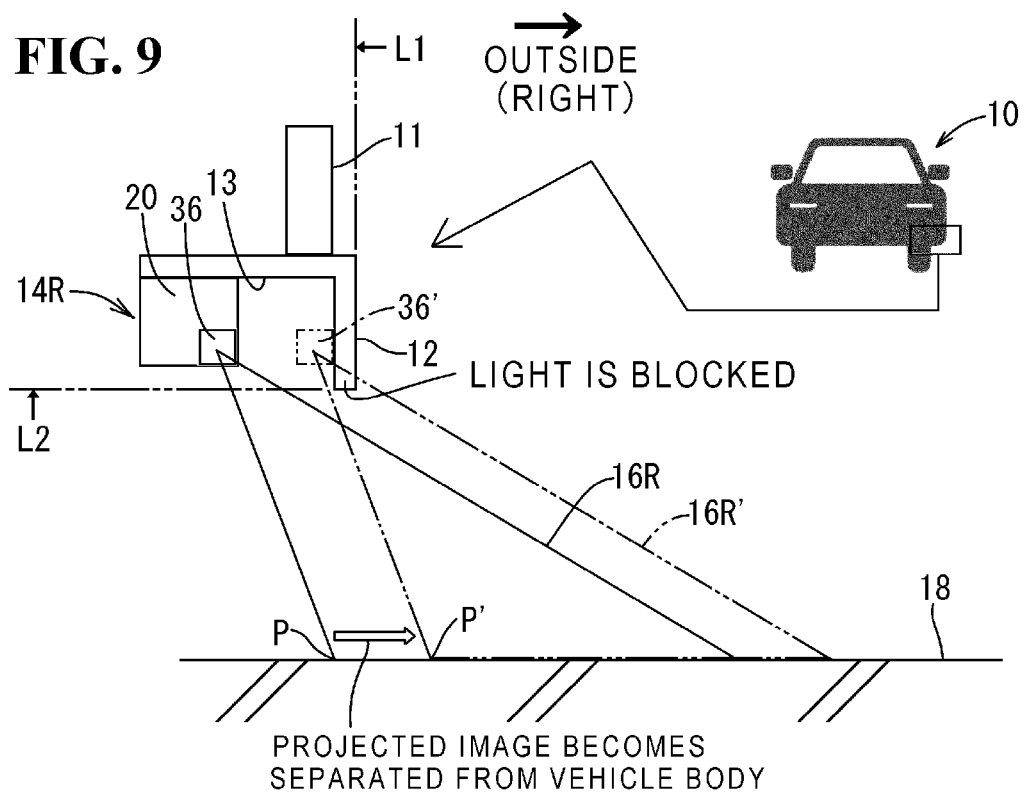

VEHICLE LAMP

The disclosure of Japanese Patent Application No. 2023-071888 filed on Apr. 25, 2023 including the specification, drawings, claims and abstract is incorporated herein by reference in its entirety.

BACKGROUND OF THE INVENTION

Field of the Invention

The present invention relates to a vehicle lamp that is installed on a side lower part of an outer part of a vehicle and projects image light of visible light onto the ground on the lateral side of the vehicle, and makes the light emitted from the vehicle lamp less likely to be visually recognized by a person around the vehicle.

Description of the Related Art

A vehicle lamp called Welcome Light Carpet (registered trademark) is known as a vehicle lamp (hereinbelow, referred to as "vehicle side projection lamp") that is installed on a side lower part [a lower part of a side part (left or right part) of a vehicle (a lower face, or a side face, or a lower side face located at the boundary between the lower face and the side face, of the side part)] of an outer part of the vehicle (a part of the vehicle exposed to a space outside the vehicle when a door is closed), and projects image light of visible light onto the ground on the lateral side (left or right side) of the vehicle (refer to "2023 BMW 3 Series-Owner's Manual-Page #161", [retrieved on Feb. 17, 2023], Internet <URL: https://ownersmanuals2.com/bmw-auto/3-series-2023-owners-manual-85302/page-161>). The Welcome Light Carpet emits image light of visible light from a projection unit installed on the lower side face of the side lower part of the outer part of the vehicle toward the ground on the lateral side of the vehicle to project the image on the ground. The vehicle side projection lamp performs the function of supporting comfortable and safe getting on or off movement by illuminating the feet of a person getting or off the vehicle. Although not a vehicle side projection lamp, Japanese Patent Laid-Open No. 2018-090191 discloses a vehicle lamp that projects an image from a headlight position at a front part of the vehicle onto the road surface ahead of the vehicle.

Although the vehicle side projection lamp is a lighting device that is disposed on the outer part of a vehicle and emits rays of light toward outside, normally, the light emitted from the vehicle side projection lamp is less likely to be visually recognized by a person around the vehicle (a pedestrian, a driver of another vehicle, etc.) because the light is emitted toward the ground diagonally downward. In reality, however, due to scattered light or stray light inside the vehicle side projection lamp, some of the rays of light emitted from the vehicle side projection lamp are emitted in a direction other than the direction toward the ground. The inventor has confirmed that such light emitted in the direction other than the direction toward the ground may be visually recognized by a person around the vehicle. It is undesirable for traffic safety that light of the vehicle side projection lamp be visually recognized by a person around the vehicle, and this may be regulated by laws and regulations in some countries. Thus, it is desirable that measures be taken to make the light less likely to be visually recognized.

The present invention has been made in view of the above-mentioned points, and an object thereof is to make light emitted from a vehicle side projection lamp less likely to visually recognized by a person around a vehicle.

SUMMARY OF THE INVENTION

The present invention provides a vehicle lamp installed on a side lower part of an outer part of a vehicle, the vehicle lamp being configured to project image light of visible light onto the ground on a lateral side of the vehicle, including: a housing; an optical system housed in the housing, the optical system being configured to generate image light of visible light; and a window disposed in a partial area of a wall face of the housing, the window including a transparent plate, the transparent plate being configured to transmit the generated image light and emit the generated image light to an external space of the housing, in which the optical system includes a lens group configured to generate the image light, an optical path bending mirror configured to bend an optical path of the generated image light, and a concave mirror configured to reflect the image light with the optical path bent and emit the image light to the external space from the window, and a positional relationship between the window and the concave mirror is set in such a manner that, in a state in which the vehicle lamp is installed on the side lower part of the outer part of the vehicle in a position that enables the vehicle lamp to project the image light emitted from the window toward the ground on the lateral side of the vehicle, at least a part of the concave mirror in the height direction is positioned higher than the whole of the window in the height direction, and more than half or the whole of the window in the height direction is positioned lower than the concave mirror. According to this, even if the window is disposed at the position where the window is visible to a person around the vehicle, it is possible to make a part or the whole of the concave mirror in the height direction invisible to the person around the vehicle because the concave mirror is disposed up to a position higher than the window. Thus, it is possible to make scattered light or stray light reflected by the concave mirror less likely to be visually recognized by the person around the vehicle.

In the present invention, the positional relationship between the concave mirror and the window may be set in such a manner that, in the state in which the vehicle lamp is installed on the side lower part of the outer part of the vehicle in a position that enables the vehicle lamp to project the image light emitted from the window toward the ground on the lateral side of the vehicle, more than half or the whole of the concave mirror in the height direction is positioned higher than the whole of the window in the height direction. According to this, even if the window is disposed at the position where the window is visible to a person around the vehicle, it is possible to make more than half or the whole of the concave mirror in the height direction invisible to the person around the vehicle. Thus, it is possible to make scattered light or stray light reflected by the concave mirror less likely to be visually recognized by the person around the vehicle.

In the present invention, a positional relationship between the window and the wall face may be set in such a manner that, in the state in which the vehicle lamp is installed on the side lower part of the outer part of the vehicle in a position that enables the vehicle lamp to project the image light emitted from the window toward the ground on the lateral side of the vehicle, more than half or the whole of the window in the height direction is positioned lower than a central position in the height direction of the wall face where the window is disposed. According to this, since the window is disposed at the position offset downward from the central position in the height direction of the wall face of the housing, it is possible to make the concave mirror less visible to a person around the vehicle and make scattered light or stray light reflected by the concave mirror less likely to be visually recognized by the person around the vehicle. In addition, since the window is disposed at the position offset downward from the central position in the height direction of the wall face of the housing, when the height of the window from the ground is predetermined, the housing can be disposed at a height relatively far from the ground, thereby making it possible to make the housing less likely to collide with bumps and dips on the ground.

In the present invention, an area of the window may be smaller than an area of a mirror surface of the concave mirror, and the window may be disposed at a position where the whole of a ray bundle of the image light reflected by the concave mirror and reduced in beam diameter can pass through the window. According to this, the window can be designed with a small area because the beam diameter is small at the position where the light passes through the window, and it is possible to make scattered light or stray light reflected by the concave mirror less likely to be visually recognized by a person around the vehicle. In addition, since the window can be designed with a small area, outside light is less likely to enter the inside of the housing through the window, and thus scattered light or stray light additionally generated inside the housing from the outside light (scattered light or stray light generated separately from the scattered light or stray light generated by the image light) can be reduced.

In the present invention, in the state in which the vehicle lamp is installed on the side lower part of the outer part of the vehicle in a position that enables the vehicle lamp to project the image light emitted from the window toward the ground on the lateral side of the vehicle, in plan view, the lens group, the optical path bending mirror, and the concave mirror of the optical system may be arranged in a vehicle front-rear direction, and the concave mirror may be disposed in a position inclined to the lateral side of the vehicle relative to the vehicle front-rear direction toward the window. According to this, since projection of the image light to the lateral side of the vehicle is achieved by arranging the lens group, the optical path bending mirror, and the concave mirror of the optical system in the vehicle front-rear direction and disposing the concave mirror in a position inclined toward the lateral side of the vehicle relative to the vehicle front-rear direction toward the window, the dimension of the housing in the vehicle width direction (left-right direction) can be reduced. As a result, it is possible to make flying stones or mud splashes from the wheel less likely to hit the housing.

In the present invention, in the state in which the vehicle lamp is installed on the side lower part of the outer part of the vehicle in a position that enables the vehicle lamp to project the image light emitted from the window toward the ground on the lateral side of the vehicle, in plan view, the housing may include an emitting-side end face facing rearward or forward of the vehicle, a side face facing sideward of the vehicle, and a corner face located between the emitting-side end face and the side face, the corner face facing diagonally sideward and rearward or diagonally sideward and forward of the vehicle, and the window may be disposed on the corner face. According to this, since the window is disposed on the corner face of the housing, the corner face facing diagonally sideward and rearward or diagonally sideward and forward of the vehicle, the angle range in the horizontal direction in which the window is visible can be made narrower than that when the window is disposed on the side face of the housing (refer to FIGS. 8A and 8B). This makes it possible to make scattered light or stray light reflected by the concave mirror less likely to be visually recognized by a person around the vehicle. In addition, since the window is disposed facing diagonally relative to the vehicle front-rear direction on the corner face, the window is less likely to receive flying stones or mud splashes from the wheel from directly front thereof, compared to a case in which the window is disposed facing the vehicle front-rear direction. In addition, since the window appears narrow from the wheel side, flying stones or mud splashes from the wheel are less likely to hit the window. Thus, it is possible to make damage and contamination of the window caused by flying stones or mud splashes from the wheel less likely to occur. These effects obtained by disposing the window on the corner face can be obtained regardless of the positional relationship between the concave mirror and the window and the positional relationship between the window and the wall face described above.

In the present invention, when viewed from the emitting-end face side of the housing, the optical path bending mirror and the concave mirror may be disposed behind the emitting-side end face, the concave mirror may be disposed above the optical path bending mirror, and an optical axis of the image light reflected by the concave mirror may be directed diagonally downward toward the window. According to this, the optical path bending mirror, the concave mirror, and the window can be efficiently disposed in the housing without emission of the image light reflected by the concave mirror through the window being obstructed (blocked) by the optical path bending mirror.

In the present invention, the vehicle lamp may further include a bracket attached to a lower face of the side lower part of the outer part of the vehicle, the bracket may hold the housing in a position that enables the image light emitted from the window to be projected toward the ground on the lateral side of the vehicle, the bracket may include a screen face disposed between the housing and a wheel of the vehicle, and the screen face may have a cutout or a hole through which the image light emitted from the window passes toward the ground on the lateral side of the vehicle. According to this, since the bracket includes the screen face disposed between the housing and the wheel of the vehicle, the screen face can receive flying stones or mud splashes from the wheel and make the flying stones or mud splashes less likely to hit the housing. Also, the image light emitted from the window of the housing can be applied to the ground on the lateral side of the vehicle through the cutout or hole in the screen face. In addition, scattered light or stray light emitted from the window of the housing can be blocked by the screen face.

BRIEF DESCRIPTION OF THE DRAWINGS

FIG. 1C is a view of the projection unit of FIG. 1A in the horizontal direction from the rear side of the vehicle with a part of a housing cut out;

FIG. 9 is a schematic view for describing an effect obtained by disposing the projection unit at a position slightly inside an outer wall face of the vehicle (the position closer to the center in the vehicle width direction), showing a state viewed from the rear side of the vehicle.

DETAILED DESCRIPTION OF THE PREFERRED EMBODIMENT

Figure 2A:
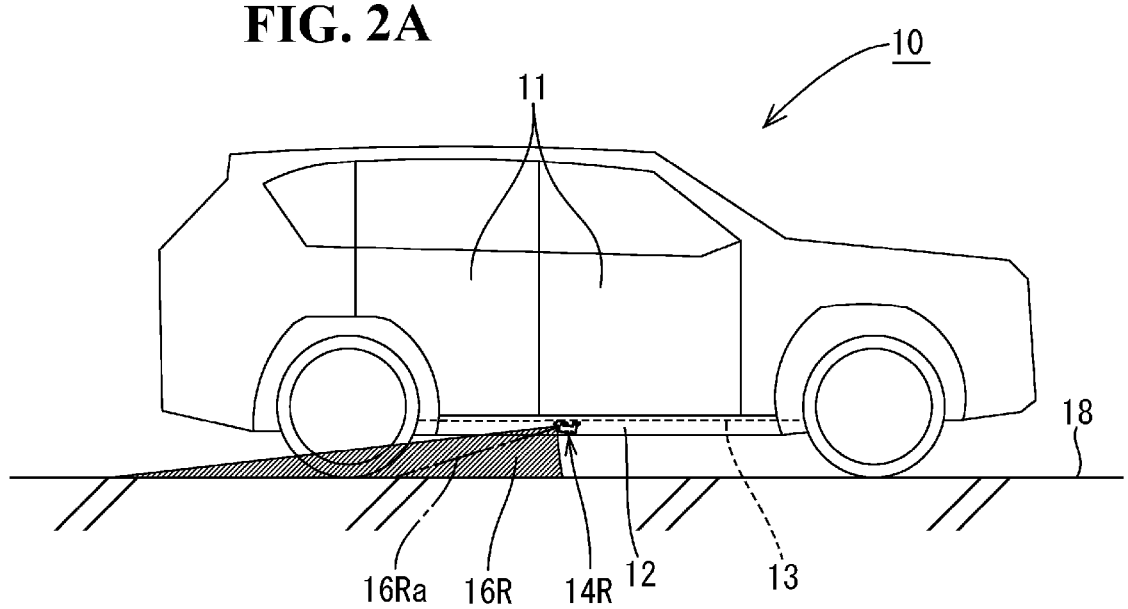
FIG. 2A is a side view of a vehicle equipped with a vehicle side projection lamp of FIG. 3 according to an embodiment of the present invention, showing image light emitted from the vehicle side projection lamp together.
Figure 2B:
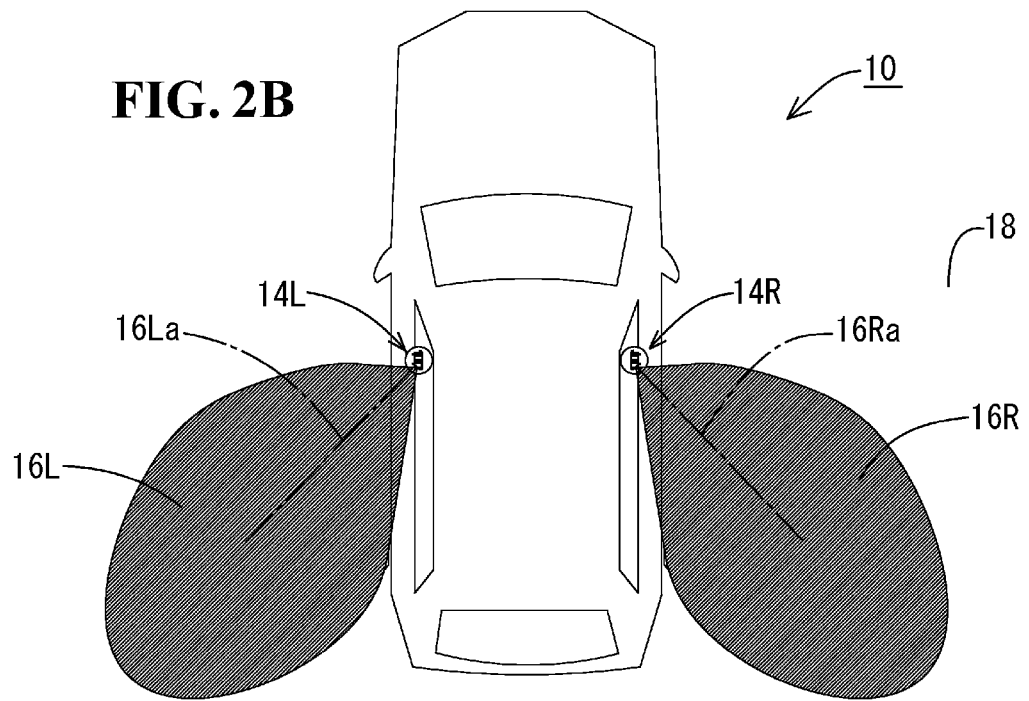
FIG. 2B is a plan view of the vehicle, showing image light emitted from the vehicle side projection lamp together.

Hereinbelow, an embodiment of the present invention will be described. FIGS. 2A and 2B show a vehicle (SUV in the embodiment) equipped with a vehicle side projection lamp according to the embodiment of the present invention. On left and right side lower parts of an outer part of a vehicle 10 [in the embodiment, on a vehicle bottom face 13 at positions slightly inside side steps 12 (side sills) under doors 11, that is, the positions closer to the center in the vehicle width direction, refer to FIG. 9], vehicle side projection lamps 14L, 14R are installed in bilaterally symmetrical positions with respect to the vehicle 10. The height of the lowest position of the vehicle side projection lamps 14L, 14R relative to the ground 18, such as a road surface, is, for example, 250 mm. The vehicle side projection lamps 14L, 14R respectively emit image light 16L and image light 16R of visible light for projecting an image (a visual element such as text, a photograph, an illustration, a diagram, or a symbol) with optical axes 16La, 16Ra (central axes of ray bundles of the image light 16L, 16R) directed toward the ground 18 diagonally sideward and rearward of the vehicle. That is, the image light 16L is emitted with the optical axis 16La directed toward the ground 18 diagonally rearward left of the vehicle (in the intermediate direction between leftward and rearward), and the image light 16R is emitted with the optical axis 16Ra directed toward the ground 18 diagonally rearward right of the vehicle (in the intermediate direction between rightward and rearward). The emitted image light 16L and image light 16R are applied to the ground 18 on the left and right sides of the vehicle, respectively, and images are projected onto the ground 18. The outer shape of the entire image projected on the ground 18 is, for example, a substantially rectangular shape long in the vehicle front-rear direction, and its dimensions are, for example, 1500 mm in the longitudinal direction (front-rear direction of the vehicle 10) and 1000 mm in the lateral direction (the width direction of the vehicle 10).

Figure 3:
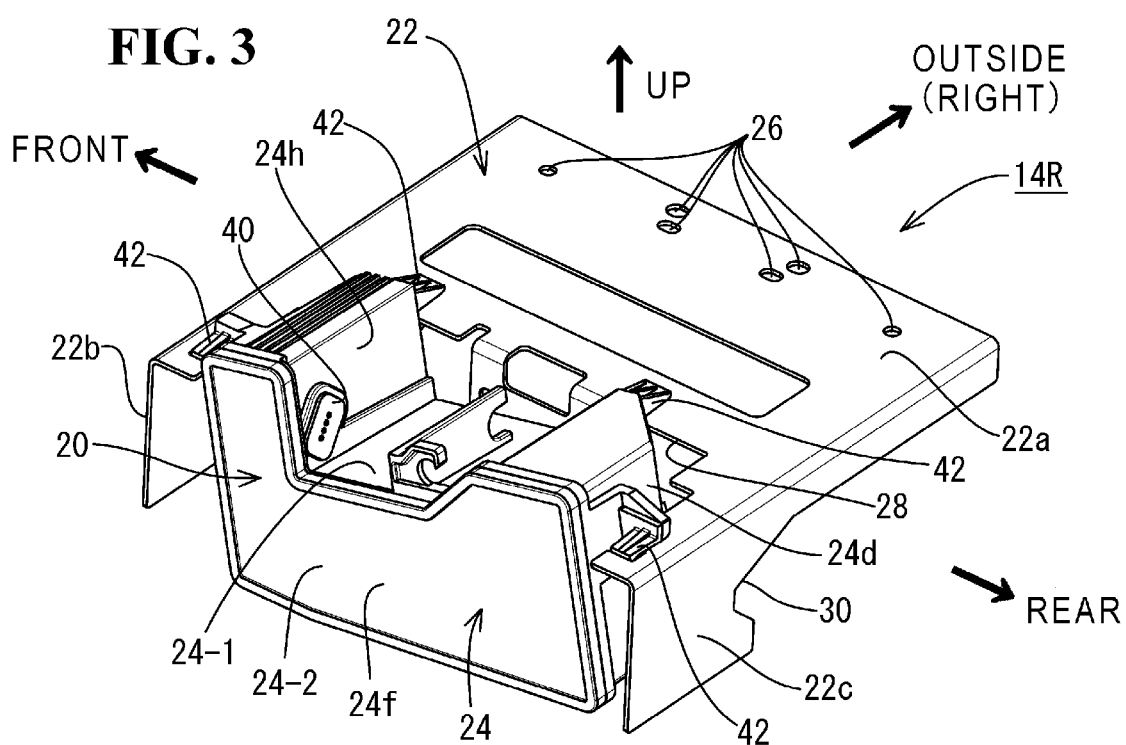
FIG. 3 is a perspective view showing the appearance of the vehicle side projection lamp (with a bracket, for the right side of the vehicle) according to the embodiment of the present invention.
Figure 4A:
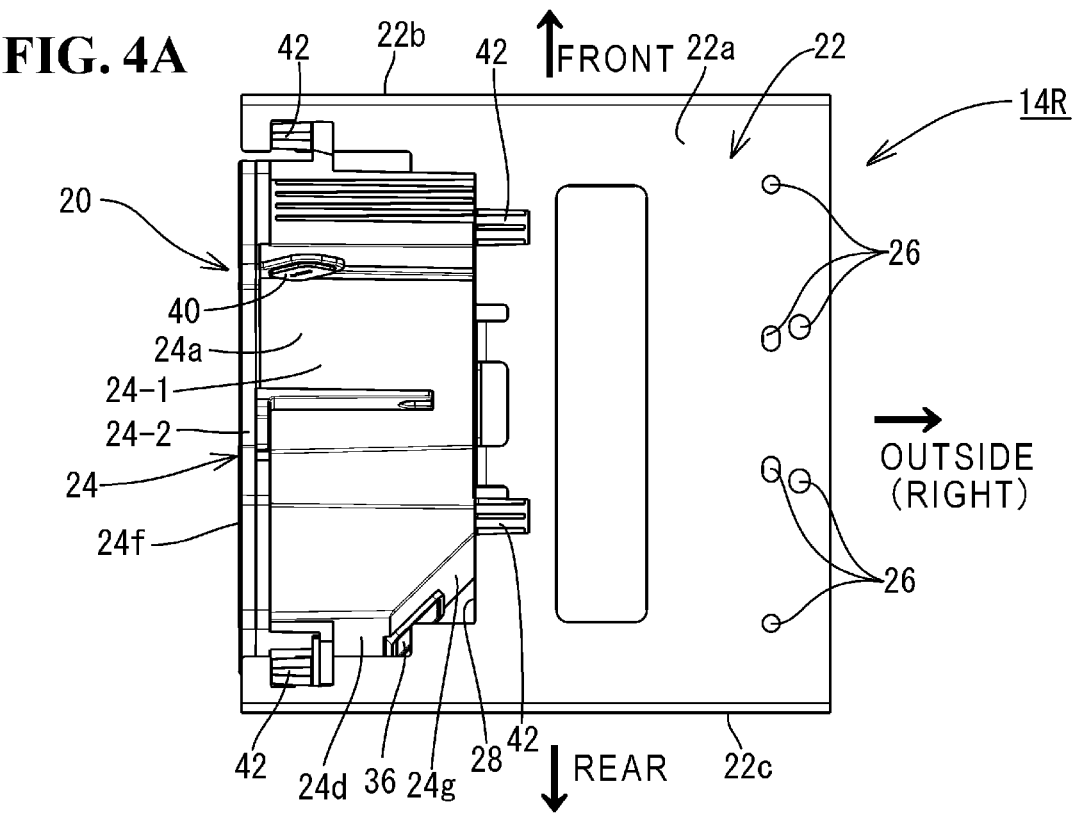
FIG. 4A is a plan view of the vehicle side projection lamp of FIG. 3.
Figure 4B:
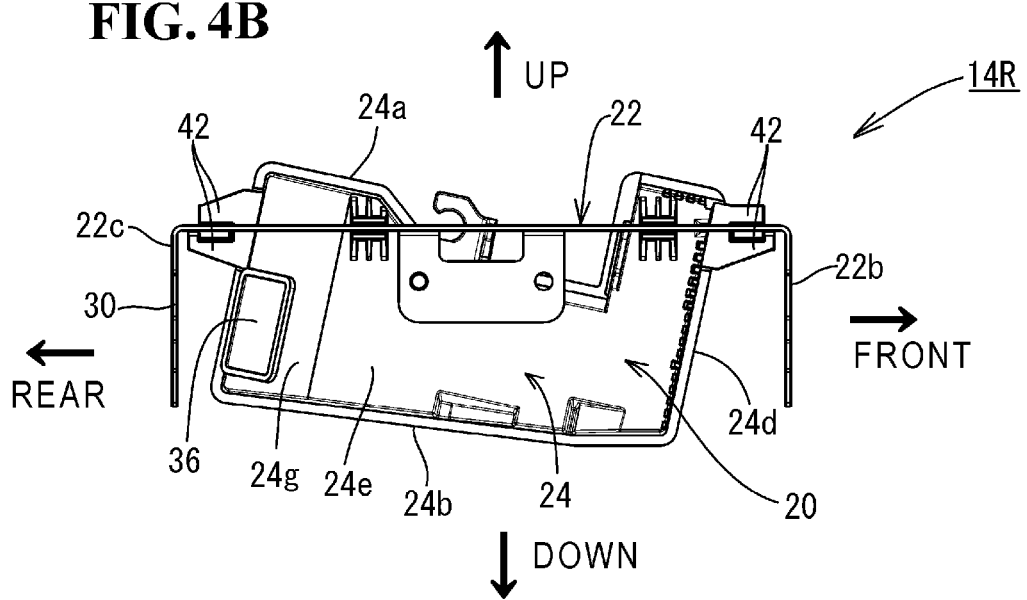
FIG. 4B is a side view of the vehicle side projection lamp of FIG. 3 (viewed from the right side of the vehicle)
Figure 4C:
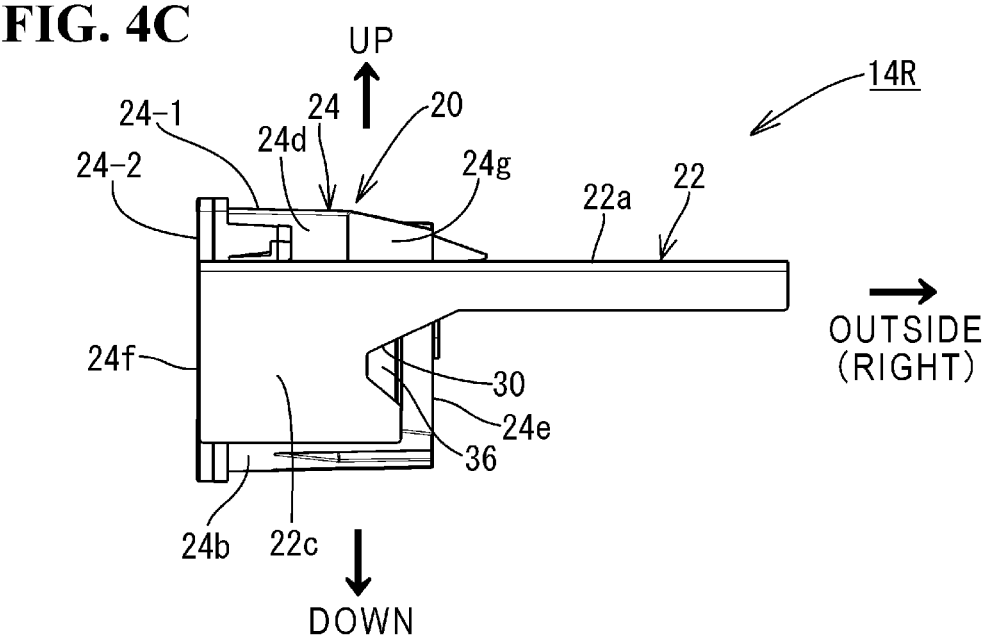
FIG. 4C is a rear view of the vehicle side projection lamp of FIG. 3 (viewed from the rear side of the vehicle)
Figure 4D:
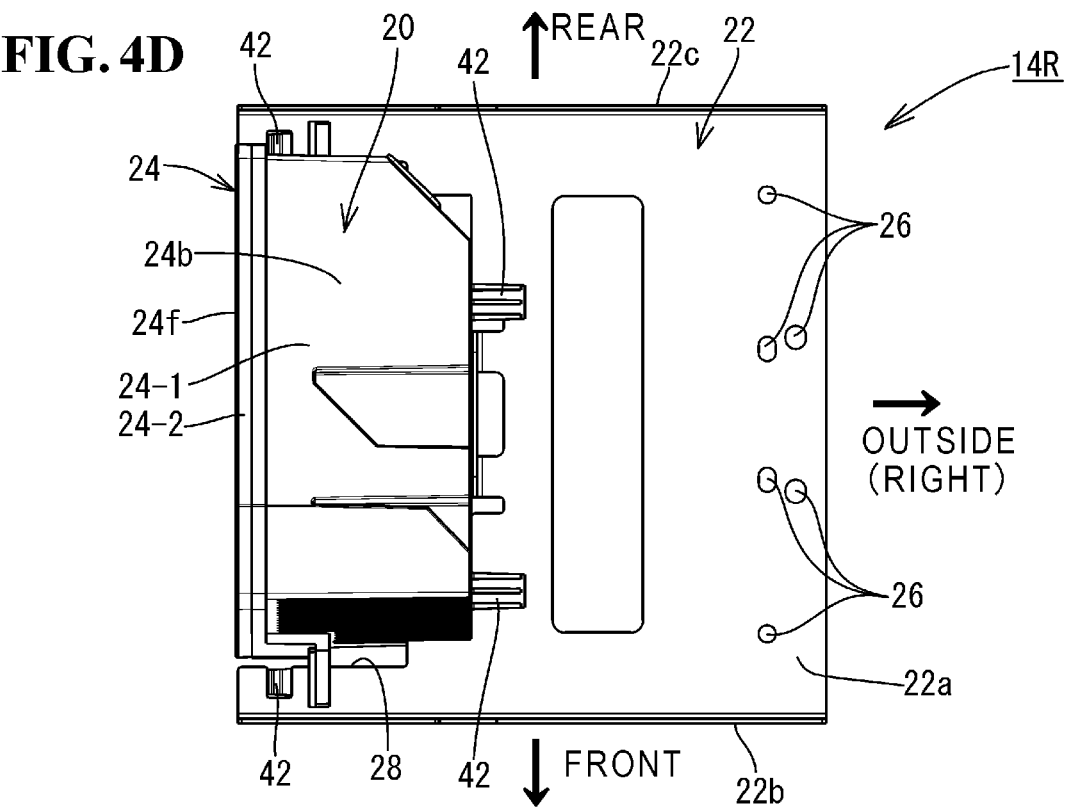
FIG. 4D is a bottom view of the vehicle side projection lamp of FIG. 3.
Figure 4E:
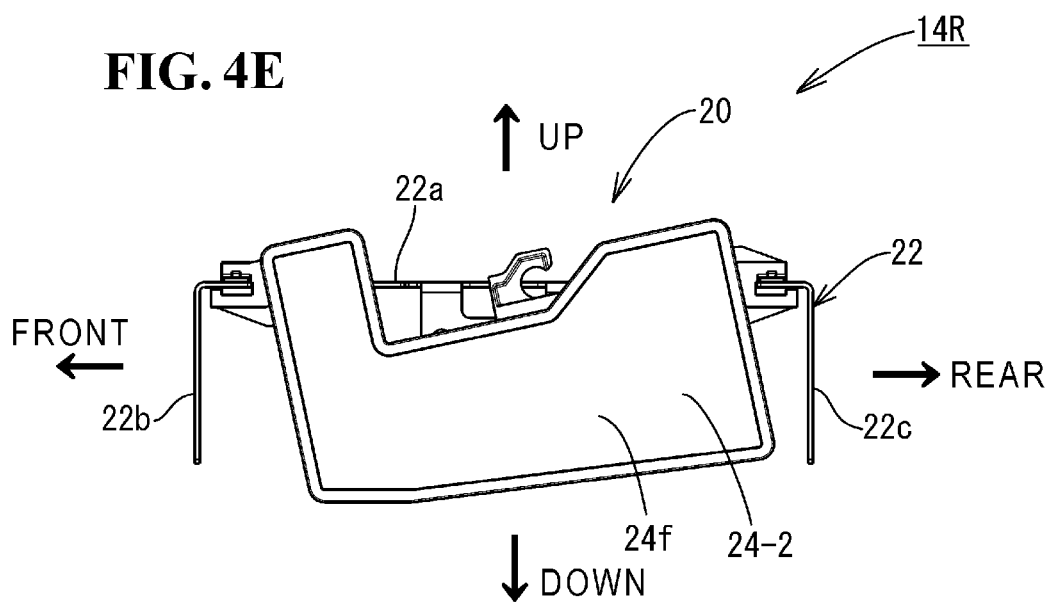
FIG. 4E is a side view of the vehicle side projection lamp of FIG. 3 (viewed from the left side of the vehicle)
Figure 4F:
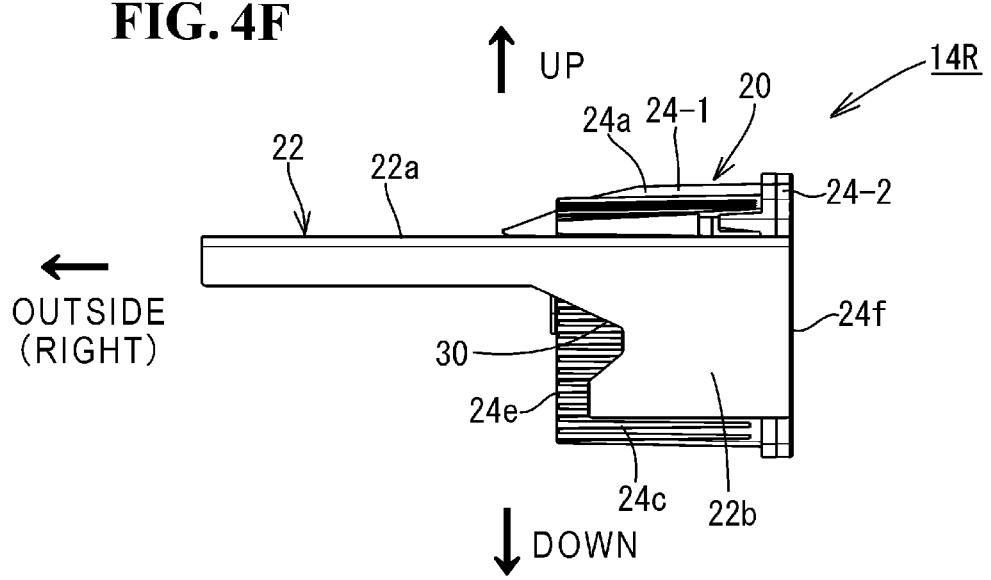
FIG. 4F is a front view of the vehicle side projection lamp of FIG. 3 (viewed from the front side of the vehicle)

The vehicle side projection lamps 14L, 14R will be described. Here, the vehicle side projection lamp 14R for the right side of the vehicle will be described. The vehicle side projection lamp 14L for the left side of the vehicle has a bilaterally symmetrical configuration with the vehicle side projection lamp 14R for the right side of the vehicle. FIG. 3 is a perspective view showing the appearance of the vehicle side projection lamp 14R. FIGS. 4A to 4F are diagrams showing each side of the vehicle side projection lamp 14R (diagrams viewed from various directions). The outline configuration of the vehicle side projection lamp 14R will be described with reference to FIG. 3. In FIG. 3, the vehicle side projection lamp 14R is formed by attaching a projection unit 20 (projector) for the right side of the vehicle to a bracket 22. By riveting the bracket 22 to the vehicle bottom face 13 at a position slightly inside the right side step 12 of the vehicle (the position closer to the center in the vehicle width direction), the vehicle side projection lamp 14R is installed on the vehicle bottom face 13 at this position. Other than riveting, various mounting methods such as screwing, welding, and swaging can be used as the method for attaching the bracket 22 to the vehicle bottom face 13. The bracket 22 is configured such that the bracket 22 can be used as both the bracket for the left side of the vehicle and the bracket for the right side of the vehicle by reversing the left and right sides. The projection unit 20 includes a light source, an optical system, and the like housed inside a housing 24. A wire harness (not shown) for connection to a vehicle power supply is drawn out of the housing 24.

The bracket 22 is formed of a metal plate such as an iron plate that is metal processed and painted entirely black. The bracket 22 includes an upper plate 22a that is to be attached to the vehicle bottom face 13 in a horizontal position (the position parallel to the vehicle bottom face 13), a front plate 22b that is bent downward at a right angle from the upper plate 22a at a position on the vehicle front side of the upper plate 22a, and a rear plate 22c that is bent downward at a right angle from the upper plate 22a at a position on the vehicle rear side of the upper plate 22a. The upper plate 22a has multiple rivets through holes 26 for riveting the bracket 22 to the vehicle bottom face 13, and a cutout 28 for disposing the projection unit 20. The projection unit 20 is disposed in the cutout 28, and the upper periphery of the housing 24 is fixed to the periphery of the cutout 28. In this way, the projection unit 20 is attached to the upper plate 22a in a suspended state. The rear plate 22c constitutes a screen face. The rear plate 22c has a cutout 30 (refer to FIGS. 3, 4C, 5D, etc.) through which the image light 16R emitted from the projection unit 20 passes toward the ground on the lateral side of the vehicle. Instead of the cutout 30, a hole with its entire circumference closed may be formed. The rear plate 22c is disposed between the projection unit 20 and a rear wheel of the vehicle so that flying stones or mud splashes from the rear wheel hit the rear plate 22c when the vehicle 10 moves backward. This makes the flying stones or mud splashes less likely to hit the projection unit 20, thereby making the projection unit 20 less prone to damage or contamination. In addition, the rear plate 22c blocks scattered light or stray light emitted from the projection unit 20. The front plate 22b is formed in a bilaterally symmetrical shape with the rear plate 22c (refer to FIGS. 4C and 4F in contrast). The front plate 22b similarly functions as a screen plate against flying stones or mud splashes from the rear wheel when the bracket 22 is used for the left side of the vehicle.

Figure 5A:
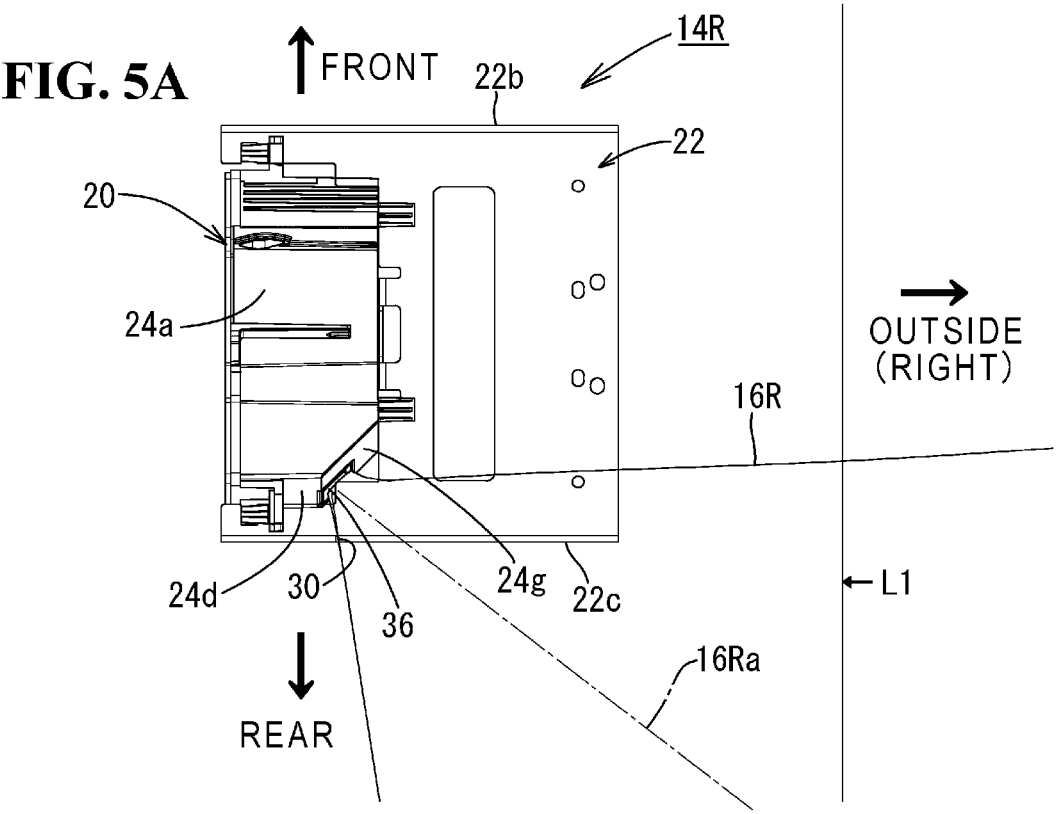
FIG. 5A is a plan view of the vehicle side projection lamp of FIG. 3, showing a ray bundle of the image light emitted from the vehicle side projection lamp together.
Figure 5B:
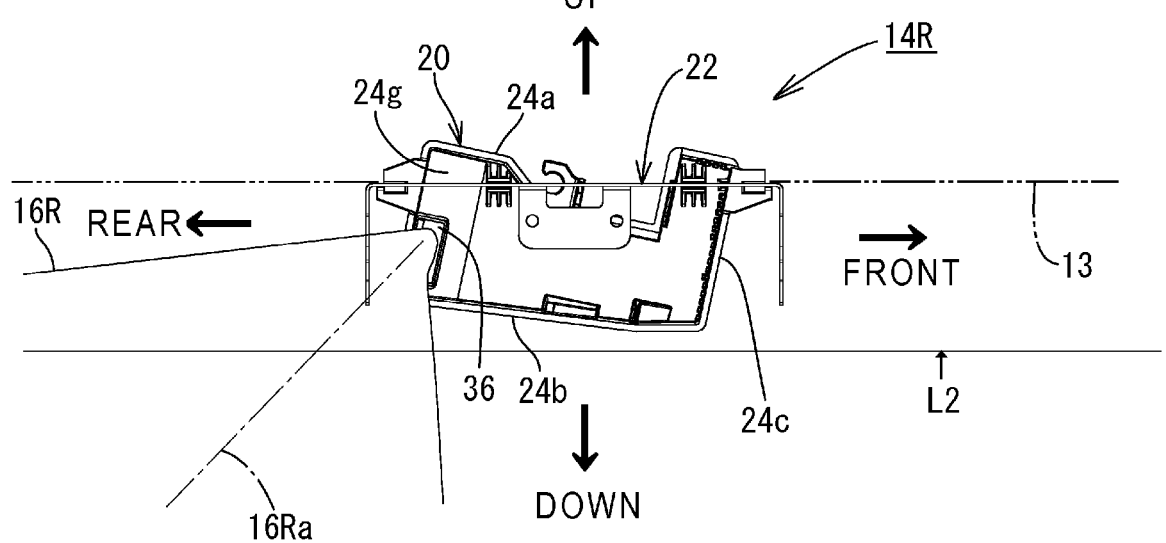
FIG. 5B is a side view of the vehicle side projection lamp of FIG. 3 (viewed from the right side of the vehicle), showing a ray bundle of the image light emitted from the vehicle side projection lamp together.
Figure 5C:
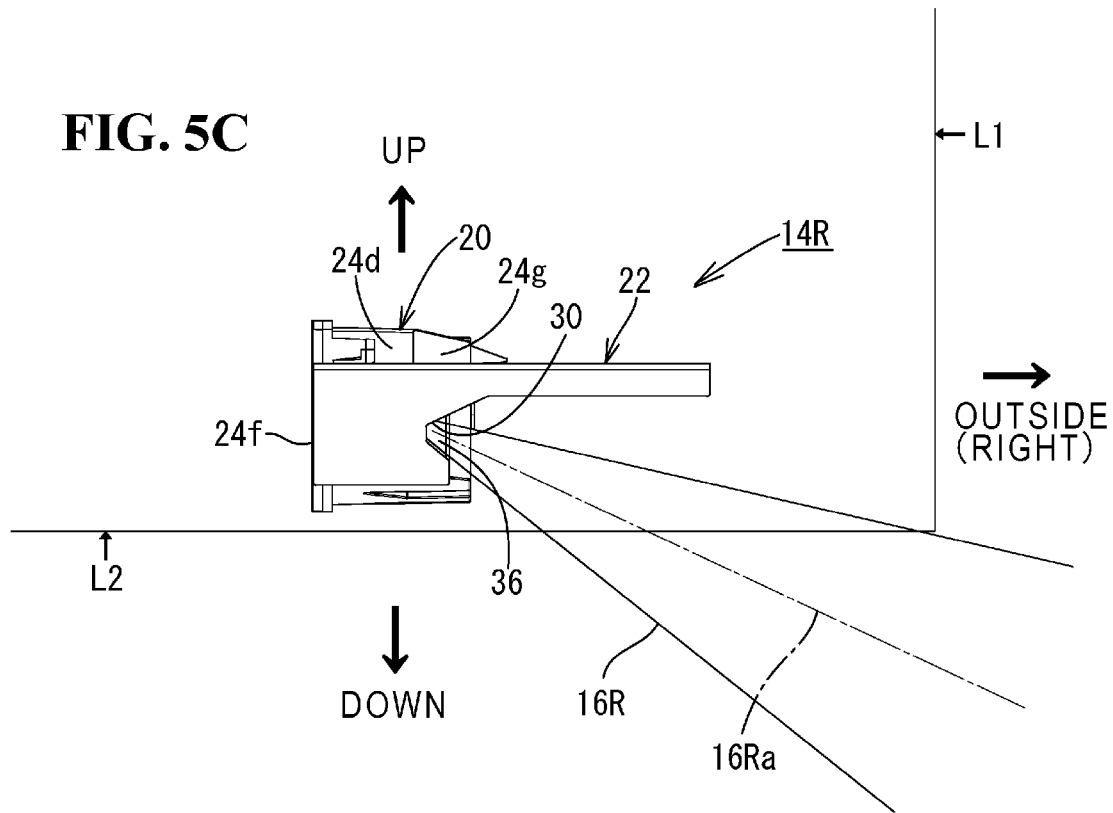
FIG. 5C is a rear view of the vehicle side projection lamp of FIG. 3 (viewed from the rear side of the vehicle), showing a ray bundle of the image light emitted from the vehicle side projection lamp together.
Figure 5D:
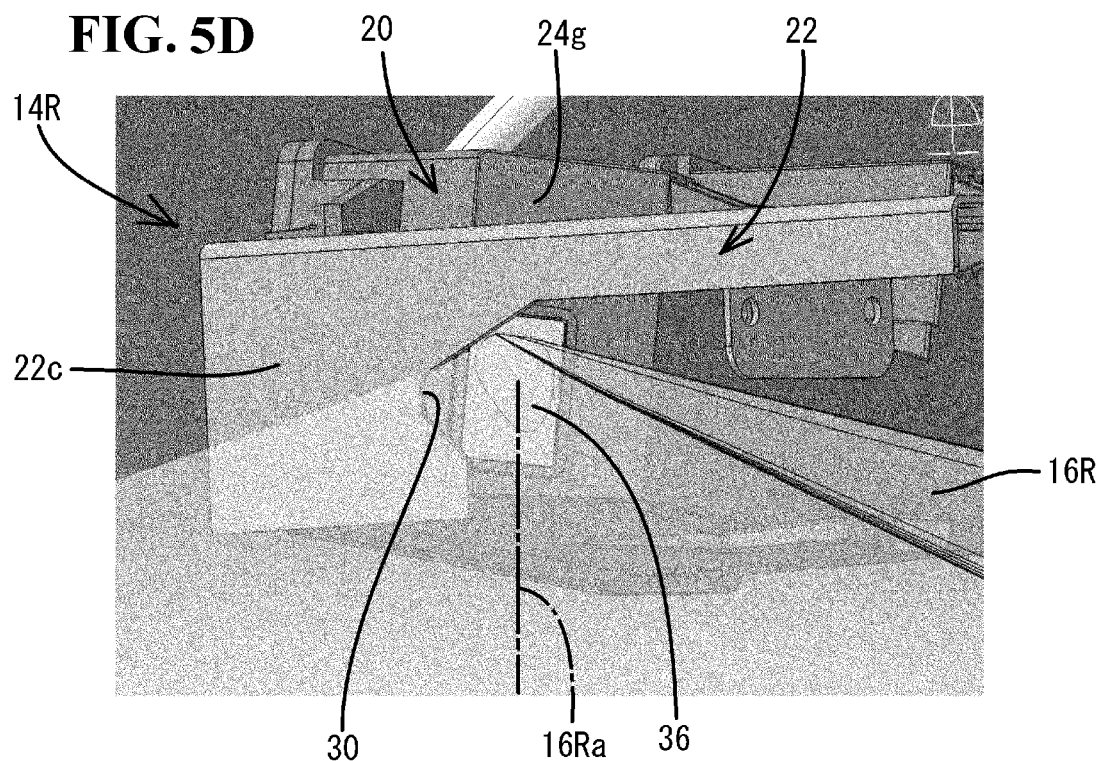
FIG. 5D is a perspective view (schematic view) of the vehicle side projection lamp of FIG. 3 viewed from diagonally rearward right of the vehicle in a state in which the vehicle side projection lamp is installed on the lower face of the right side part of the vehicle, showing a ray bundle of the image light emitted from the vehicle side projection lamp together.

FIG. 5A (plan view), FIG. 5B (side view from the right side of the vehicle), FIG. 5C (rear view from the rear side of the vehicle) and FIG. 5D (perspective view from diagonally rearward right of the vehicle) show a ray bundle of the image light 16R emitted from the vehicle side projection lamp 14R mounted on the vehicle at a predetermined position (on the vehicle bottom face 13 slightly inside the right side step 12 of the vehicle 10 shown in FIG. 2A). In FIGS. 5A to 5C, a line L1 indicates the left-right direction position of the outer wall face of the right side step 12, and a line L2 indicates the height direction position of the lower end face of the right side step 12 (refer to FIG. 9). As shown in FIG. 5A, the projection unit 20 is disposed with its longitudinal direction aligned with the vehicle front-rear direction. In addition, as shown in FIG. 5B, the projection unit 20 is disposed with its rear part slightly inclined upward relative to the horizontal direction. The reason why the rear part of the projection unit 20 is inclined upward in this manner is to project an image enlarged in the vehicle front-rear direction onto the ground. The image light 16R is applied to the ground 18 with the optical axis 16Ra (the central axis of a ray bundle of the image light 16R) directed toward the ground 18 diagonally rearward right of the vehicle. The cross-sectional area of the ray bundle of the image light 16R in the direction perpendicular to the optical axis expands as it approaches the ground. As a result, the image of the image light 16R is projected onto the ground on the right side of the vehicle (refer to FIGS. 2A and 2B). In the embodiment, the side steps 12 of the vehicle 10 equipped with the vehicle side projection lamps 14L, 14R have a large dimension of downward protrusion relative to the vehicle bottom face 13 located inside the side steps 12 (at the positions closer to the center in the vehicle width direction), and the vehicle side projection lamps 14L, 14R are installed on the vehicle bottom face 13 inside the side steps 12. Thus, windows 36 of the projection units 20 are hidden by the side steps 12 and thus mostly invisible when viewed from the left and right sides of the vehicle 10 (refer to FIGS. 5B, 5C, and 9). Therefore, in this arrangement, the possibility of scattered light or stray light emitted from the windows 36 of the projection units 20 being visually recognized by a person around the vehicle 10 is not so high. However, in some vehicles, the windows 36 of the projection units 20 may be visible from the lateral side of the vehicle when the vehicle side projection lamps 14L, 14R are installed on the vehicle bottom face inside the side steps due to a small downward protrusion amount of the side steps relative to the vehicle bottom face. When the vehicle side projection lamps 14L, 14R are mounted on such a vehicle, the arrangement according to the present invention is particularly effective.

Figure 1A:
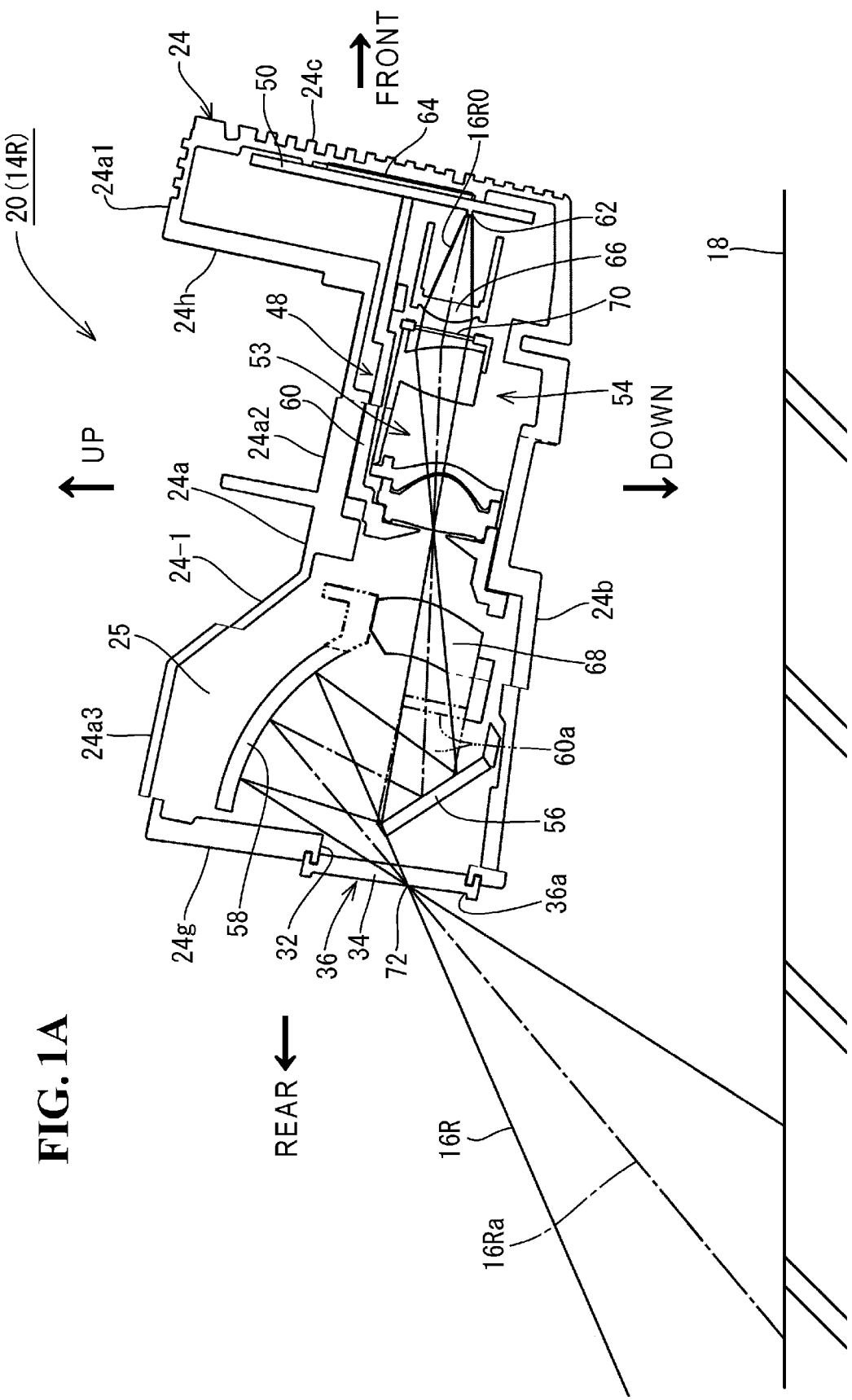
FIG. 1A is a sectional side view showing an internal structure of a projection unit of FIG. 6 in a position mounted on a vehicle on a cross section taken along an optical axis, showing a ray bundle of light emitted from a light source together.
Figure 6:
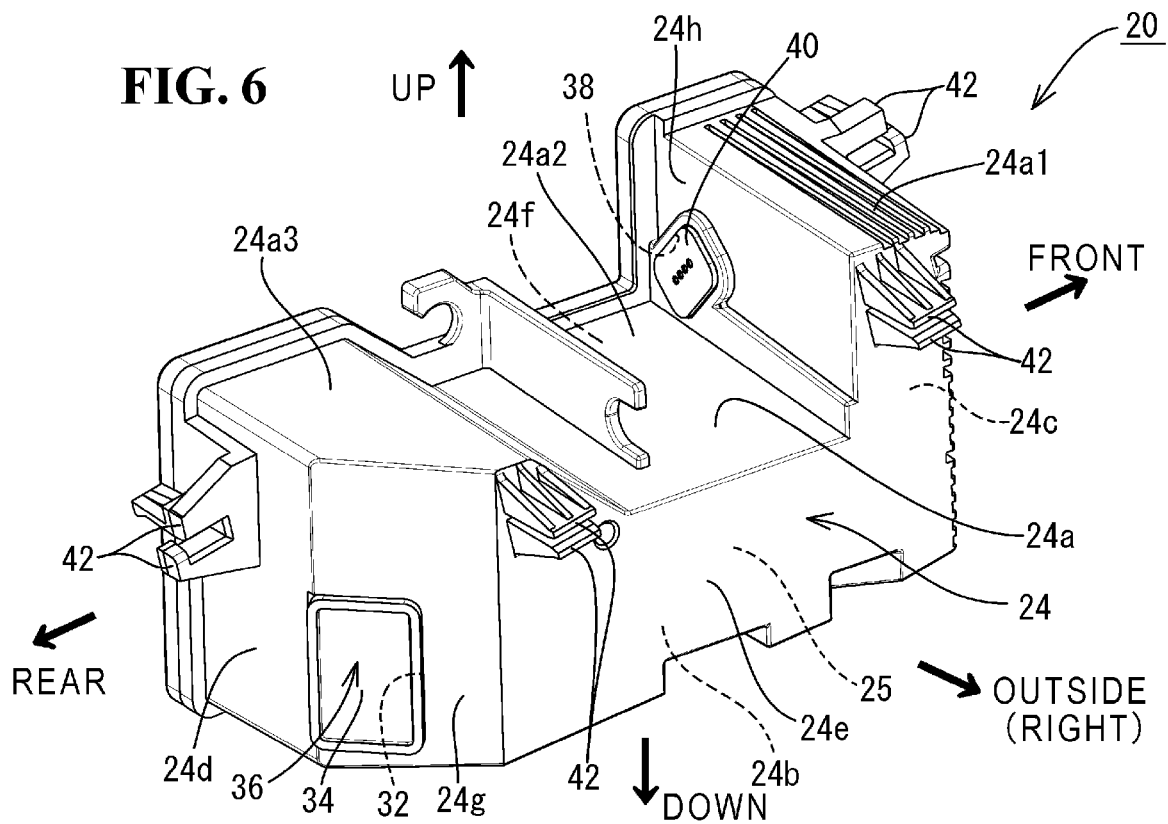
FIG. 6 is a perspective view showing the appearance of the projection unit obtained by detaching the bracket from the vehicle side projection lamp of FIG. 3.

The projection unit 20 will be described. FIG. 6 is a perspective view showing the appearance of the projection unit 20. In the embodiment, the projection unit 20 is formed in a substantially rectangular parallelepiped shape as a whole. The longitudinal dimension of the projection unit 20 excluding front and rear mounting pinching pieces 42, 42 is approximately 11 cm to 12 cm. However, the projection unit 20 may be configured to be larger or smaller than this range. An internal space 25 of the projection unit 20 is sealed by the housing 24. The light source, the optical system, and the like are housed in the internal space 25. The housing 24 is formed of a structure such as a molded plastic or processed metal with black base color and no paint or pained black on all inner and outer surfaces. The plane shape of the housing 24 is a substantially rectangular shape with its longitudinal direction aligned with the vehicle front-rear direction. The housing 24 includes, in a state in which the vehicle side projection lamp 14R is mounted on the vehicle, an upper face 24a facing upward of the vehicle, a lower face 24b facing downward of the vehicle, a front face 24c facing forward of the vehicle, a rear face 24d (emitting-side end face) facing rearward of the vehicle, a right side face 24e facing rightward of the vehicle, a left side face 24f facing leftward of the vehicle, and a corner face 24g that is located between the rear face 24d and the right side face 24e and faces diagonally rearward right of the vehicle. The window 36 is formed on the lower part of the corner face 24g. The window 36 is formed by closing an opening 32 formed in the corner face 24g with a transparent plate 34 (a transparent plastic plate, a transparent glass plate, etc.). A protrusion 24a1 is formed on the front part in the longitudinal direction of the upper face 24a (the part toward the front side of the vehicle), and a protrusion 24a3 is formed on the rear part of the upper face 24a (the part toward the rear side of the vehicle). As shown in FIG. 1A, a printed circuit board 50 is housed and disposed inside the protrusion 24a1 of the housing 24. An optical path bending mirror 56 (turning mirror) and a concave mirror 58 of an optical system 53 are disposed inside the protrusion 24a3. A lens group 54 of the optical system 53 is disposed inside a constriction 24a2 between the protrusion 24a1 and the protrusion 24a3. An erected wall face 24h between the protrusion 24a1 and the constriction 24a2 has an opening 38 (FIG. 6) for inserting a connector at an end of the wire harness (not shown) and connecting the connector to a connector of the printed circuit board. The opening 38 is closed with a connector seal 40 (waterproof rubber seal) through which the wire harness is passed. In FIG. 6, multiple mounting pinching pieces 42 (claw engagement pieces) are formed in a protruding manner on the upper periphery of the housing 24 to attach the housing 24 to the bracket 22 (FIG. 3). The projection unit 20 is attached to the bracket 22 by inserting the periphery of the cutout 28 (FIG. 3) of the bracket 22 into the mounting pinching pieces 42 and pinching (claw-fitting) it therein.

Figure 1B:
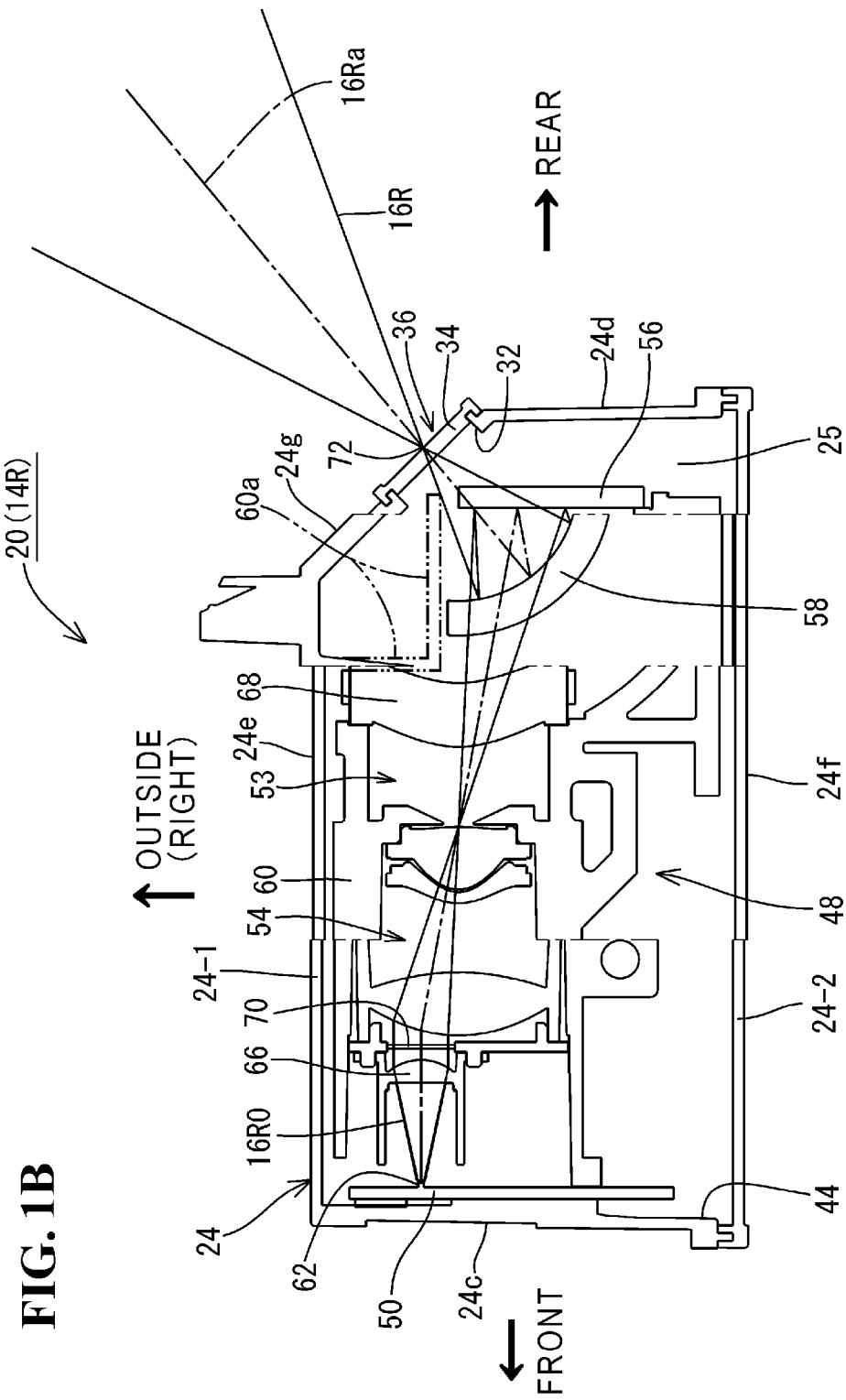
FIG. 1B is a sectional plan view showing the internal structure of the projection unit of FIG. 6 in the position mounted on the vehicle on the cross section taken along the optical axis, showing a ray bundle of light emitted from the light source together.
Figure 7:
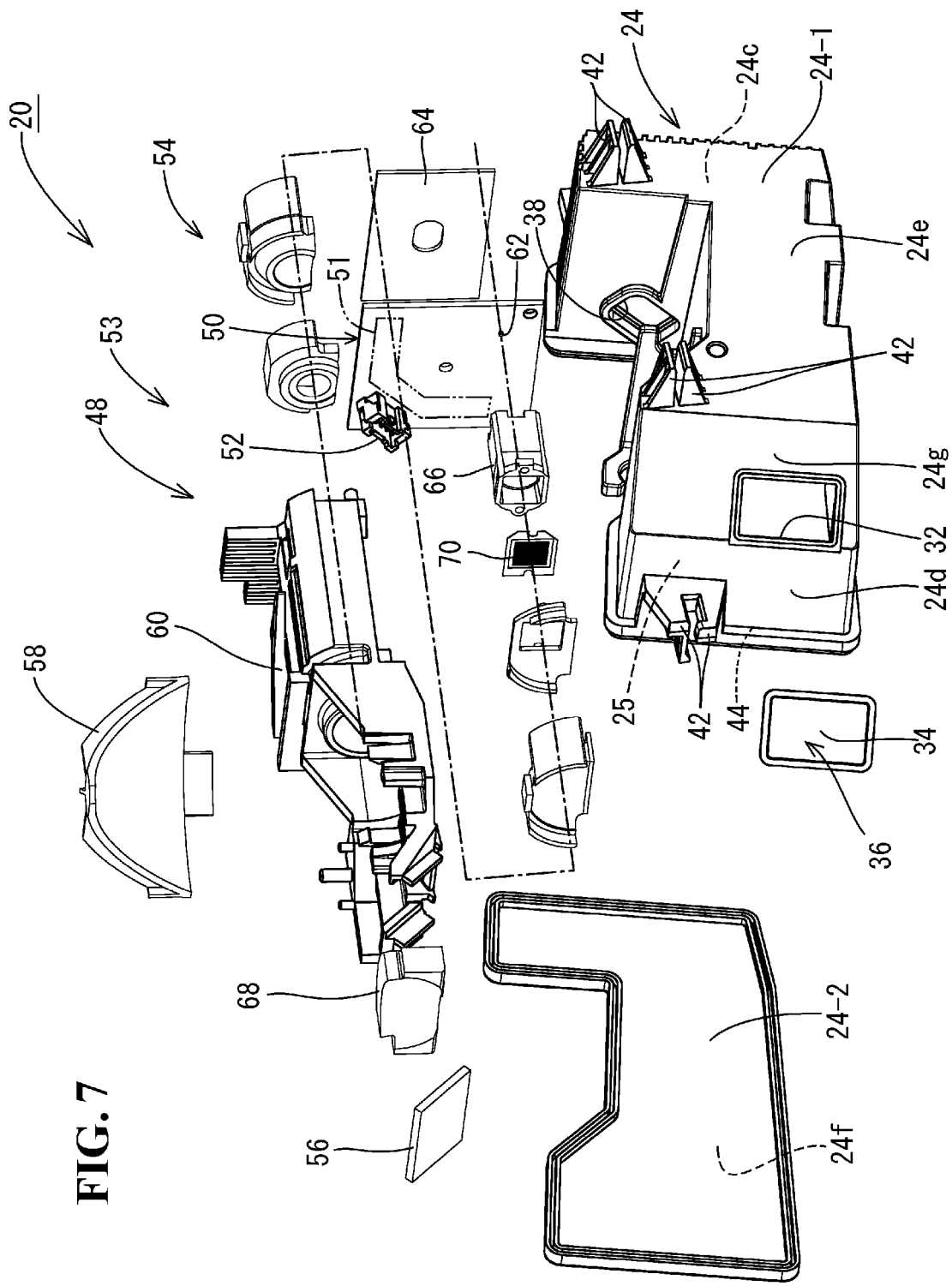
FIG. 7 is an exploded perspective view of the projection unit of FIG. 6.

FIG. 7 is an exploded perspective view of the configuration of the projection unit 20. The housing 24 is formed of a body 24-1, and a lid 24-2. The lid 24-2 constitutes the left side face 24f of the housing 24. The body 24-1 has an opening 44 at a position corresponding to the left side face 24f. The transparent plate 34 is fitted in the opening 32 of the body 24-1, and the transparent plate 34 is fixed to the body 24-1 by, for example, welding. As a result, the opening 32 is closed with the transparent plate 34 to form the window 36. An internal structure 48 integrally assembled as a whole is housed in the internal space 25 of the housing 24 through the opening 44 (FIG. 1B). After the internal structure 48 is housed in the internal space 25, the opening 44 is closed with the lid 24-2, and the lid 24-2 is hermetically fixed to the body 24-1 by, for example, welding. In this way, the projection unit 20 is integrally assembled. When the projection unit 20 is in an assembled state, the internal structure 48 is housed in the internal space 25 without any backlash. After the projection unit 20 is assembled, the connector at the end of the wire harness (not shown) is inserted into the opening 38 and connected to a connector 52 mounted on the printed circuit board 50, and power is supplied from a battery of the vehicle to a circuit of the printed circuit board 50.

The internal structure 48 will be described. In FIG. 7, the internal structure 48 is formed of the printed circuit board 50 and the optical system 53 that are integrally assembled to a frame 60. The frame 60 is formed of a structure such as a molded plastic or processed metal with black base color and no paint or pained black on all inner and outer surfaces. The optical system 53 includes the lens group 54, the optical path bending mirror 56, and the concave mirror 58. In addition to the connector 52, one white LED 62 (light source), and circuit elements 51 that constitute a driving circuit for the white LED 62 are mounted on the printed circuit board 50. A heat conductive sheet 64 for heat dissipation is stuck to a rear face of the printed circuit board 50 or an inner wall face of the front face 24c of the housing 24. The lens group 54 is formed of a combination of multiple lenses from a first stage lens 66 to a last stage lens 68. An image film 70 on which an image to be projected is drawn is disposed at a midway position of the lens group 54. The optical path bending mirror 56 is formed of a substrate such as, for example, a plastic, glass, or metal substrate, and a reflective film formed on the surface of the substrate. A lustrous metal substrate having a high reflectivity may be used as the optical path bending mirror 56 by using the surface of the metal substrate as it is (without forming a reflective film) as a reflective surface. The optical path bending mirror 56 may be formed of a flat mirror or a curved mirror having a curvature. In the embodiment, the optical path bending mirror 56 is formed of a flat mirror. The concave mirror 58 is formed of a substrate such as, for example, a plastic, glass, or metal substrate, and a reflective film formed on the surface (concave surface) of the substrate. A lustrous metal substrate having a high reflectivity may be used as the concave mirror 58 by using the surface (concave surface) of the metal substrate as it is (without forming a reflective film) as a reflective surface. The concave mirror 58 may be formed of, for example, a spherical mirror having a constant curvature, a gradually-changing curvature mirror having a gradually changing curvature, or a free form mirror. In the embodiment, the concave mirror 58 is formed of a spherical mirror. With the above configuration, white light emitted from the white LED 62 is focused by the lens group 54 and converted to image light by the image film 70 at the midway position of the lens group 54. The image light is reflected by the optical path bending mirror 56, and the optical path of the image light is bent. The image light is further reflected by the concave mirror 58, transmitted through the window 36, and emitted to the outside of the housing 24. The cross-sectional area of a ray bundle of the image light emitted to the outside of the housing 24 is gradually expanded (the image is enlarged). The area of the window 36 is smaller than the area of the mirror surface of the concave mirror 58.

FIGS. 1A and 1B are sectional views (end views) showing the internal structure of the projection unit 20 in an assembled state. FIGS. 1A and 1B show the projection unit 20 in the position mounted on the vehicle. FIG. 1A is a view of the projection unit 20 from the right side of the vehicle, and FIG. 1B is a view of the projection unit 20 from above the vehicle. FIGS. 1A and 1B both show an end face of the optical system 53 taken along the optical axis and show the ray bundle together. Also, FIG. 1C shows the projection unit 20 of FIG. 1A viewed in the horizontal direction from the rear side of the vehicle with a part of the housing 24 cut out. As can be understood from FIGS. 1B and 1C, the optical path bending mirror 56 and the concave mirror 58 are disposed behind the rear face 24d of the housing 24 viewed from the rear side of the vehicle. Also, as can be understood from FIGS. 1A and 1C, the concave mirror 58 is disposed above the optical path bending mirror 56. Also, as can be understood from FIGS. 1A and 1B, the optical axis 16Ra of the image light 16R reflected by the concave mirror 58 is directed diagonally downward toward the window 36. According to such arrangement, the optical path bending mirror 56, the concave mirror 58, and the window 36 can be efficiently disposed in the housing 24. In addition, as can be understood from the plan view of FIG. 1B (viewed from above the upper face 24a of the housing 24), projection of the image light 16R to the lateral side of the vehicle is achieved by arranging the lens group 54, the optical path bending mirror 56, and the concave mirror 58, which constitute the optical system 53, in the vehicle front-rear direction and setting the orientation of the concave mirror 58 in the last stage at an angle relative to the vehicle front-rear direction. Thus, the dimension of the housing 24 in the vehicle width direction can be reduced. As a result, it is possible to make flying stones or mud splashes from the rear wheel less likely to hit the housing 24 when the vehicle 10 moves backward.

In FIGS. 1A and 1B, light 16R0 emitted from the white LED 62 is focused through the lens group 54 from the first stage lens 66 to the last stage lens 68. The light 16R0 is converted to the image light 16R by the image film 70 at the midway position of the lens group 54. The image light 16R emitted from the lens group 54 is reflected by the surface of the optical path bending mirror 56, and the optical path of the image light 16R is bent (turned back) diagonally upward. The image light 16R is further reflected by the surface of the concave mirror 58 and emitted from the window 36. In order to make light leaking around the ray bundle of the image light 16R emitted from the lens group 54 less likely to be directly emitted from the window 36, a light shielding wall 60a is disposed at a position between the last stage lens 68 of the lens group 54 and the window 36 (the position where the ray bundle of the image light 16R is not blocked, whereas light leaking around the ray bundle is blocked). The light shielding wall 60a is formed in a part of the frame 60.

Here, the positional relationship between the parts will be described with reference to FIGS. 1A, 1B, and 1C. As shown in FIGS. 1A and 1C, the concave mirror 58 is disposed up to a position higher than the window 36. Specifically, at least a part (in the embodiment, substantially the whole) of the concave mirror 58 in the height direction is positioned higher than the whole of the window 36 in the height direction, and more than half or the whole (in the embodiment, substantially the whole) of the window 36 in the height direction is positioned lower than the concave mirror 58. Accordingly, even if the window 36 is visible to a person around the vehicle, it is possible to make a part or the whole of the concave mirror 58 in the height direction invisible through the window 36 to the person around the vehicle. Thus, even if scattered light or stray light inside the projection unit 20 is reflected by the concave mirror 58 and emitted from the window 36, it is possible to make the scattered light or stray light less likely to be visually recognized by the person around the vehicle.

As shown in FIGS. 1A and 1C, more than half or the whole (substantially the whole in the embodiment) of the concave mirror 58 in the height direction is positioned higher than the whole of the window 36 in the height direction. Accordingly, even if the window 36 is visible to a person around the vehicle, it is possible to make more than half or the whole of the concave mirror 58 in the height direction invisible to the person around the vehicle. Thus, even if scattered light or stray light inside the projection unit 20 is reflected by the concave mirror 58 and emitted from the window 36, it is possible to make the scattered light or stray light less likely to be visually recognized by the person around the vehicle.

As shown in FIGS. 1A and 1C, more than half or the whole of the window 36 in the height direction is positioned lower than the central position in the height direction of the corner face 24g where the window 36 is disposed. Accordingly, the window 36 is disposed at the position offset downward from the central position in the height direction of the wall face of the housing 24, which makes it possible to make the concave mirror 58 less visible to a person around the vehicle. Thus, even if scattered light or stray light inside the projection unit 20 is reflected by the concave mirror 58 and emitted from the window 36, it is possible to make the scattered light or stray light less likely to be visually recognized by the person around the vehicle. In addition, since the window 36 is disposed at the position offset downward from the central position in the height direction of the wall face of the housing 24, when the height of the window 36 from the ground is predetermined, the housing 24 can be disposed at a height relatively far from the ground, thereby making it possible to make the housing 24 less likely to collide with bumps and dips on the ground. A lower edge 36a of the window 36 may be placed at the lowest position (in the embodiment, substantially the lowest position) of the corner face 24g.

As shown in FIGS. 1A and 1B, the window 36 is disposed near a focal point 72 of the image light 16R reflected by the concave mirror 58. The focal point is the position where the image light 16R is focused, that is, the position in the optical axis direction of the image light 16R where the beam diameter of the ray bundle of the image light 16R is smallest. Although the area of the window 36 is smaller than the area of the mirror surface of the concave mirror 58, the window 36 can transmit the entire ray bundle of the image light 16R because the window 36 is disposed near the focal point 72 where the entire ray bundle of the image light 16R reflected by the concave mirror 58 and reduced in beam diameter can pass through the window 36. This enables the window 36 to be designed with a small area, thereby making it possible to make scattered light or stray light inside the projection unit 20 reflected by the concave mirror 58 less likely to be visually recognized by a person around the vehicle. The positional relationship between the focal point 72 and the window 36 can be set in various ways. That is, the window 36 can be disposed at the position of the focal point 72, or the window 36 can be disposed before the focal point 72 (the focal point 72 is positioned outside the housing 24), or the window 36 can be disposed outside the focal point 72 (the focal point 72 is positioned inside the housing 24). Disposing the window 36 before the focal point 72 has an advantage in that the dimension of the housing 24 in the front-rear direction can be reduced, but, on the other hand, increases susceptibility to dust outside the housing 24. That is, since the focal point 72 is located outside the housing 24, dust may enter the focal point 72, which may result in a rough projected image. On the other hand, when the window 36 is disposed outside the focal point 72, since the focal point 72 is located inside the housing 24, susceptibility to dust outside the housing 24 is reduced. That is, dust does not enter the focal point 72, and the influence of dust on the projected image is thus reduced.

Figure 8A:
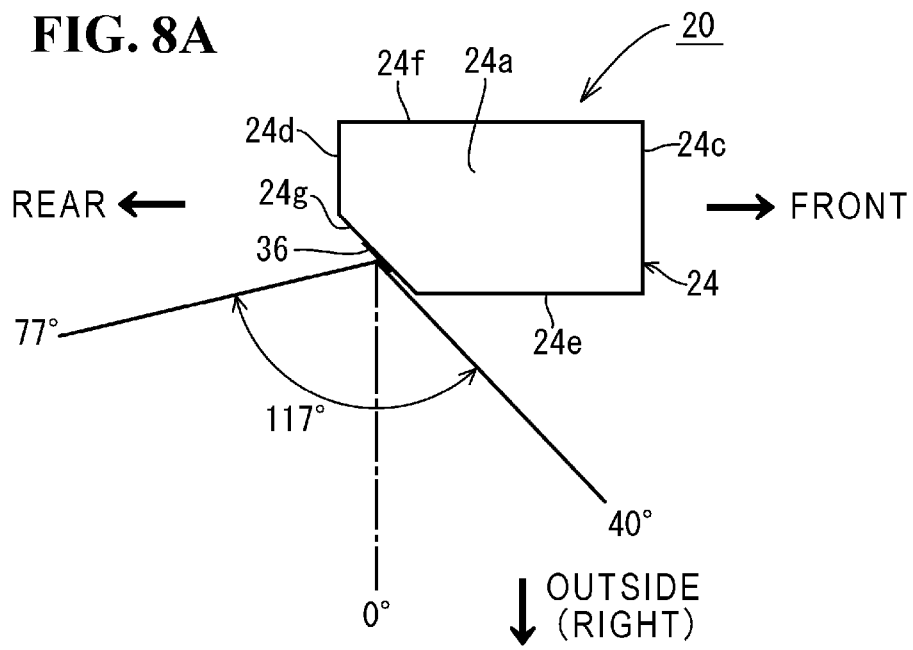
FIG. 8A is a schematic plan view showing an angle range in the horizontal direction in which a window disposed on a corner face of the housing is visible in the arrangement of the vehicle side projection lamp of FIGS. 2A and 2B.

Next, effects obtained by disposing the window 36 on the corner face 24g will be described. FIG. 8A schematically shows an angle range in the horizontal direction in which the window 36 is visible in the arrangement of the vehicle side projection lamp 14R of FIGS. 2A and 2B. This angle range is the range in which scattered light or stray light inside the projection unit 20 may be visually recognized by a person around the vehicle through the window 36. Assuming that the position of the window 36 is the center of the angle and the right side of the vehicle from the center is 0 degree, the window 36 is visible in the range of 0 degree to 40 degrees in the front direction of the vehicle until the window 36 is hidden by the housing 24 (until the corner face 24g becomes invisible). In the rear direction of the vehicle, the window 36 is visible in the range of 0 degree to 77 degrees until the window 36 is hidden by the rear wheel. Thus, the window 36 is visible in the total range of 117 degrees in the front and rear directions of the vehicle.

Figure 8B:
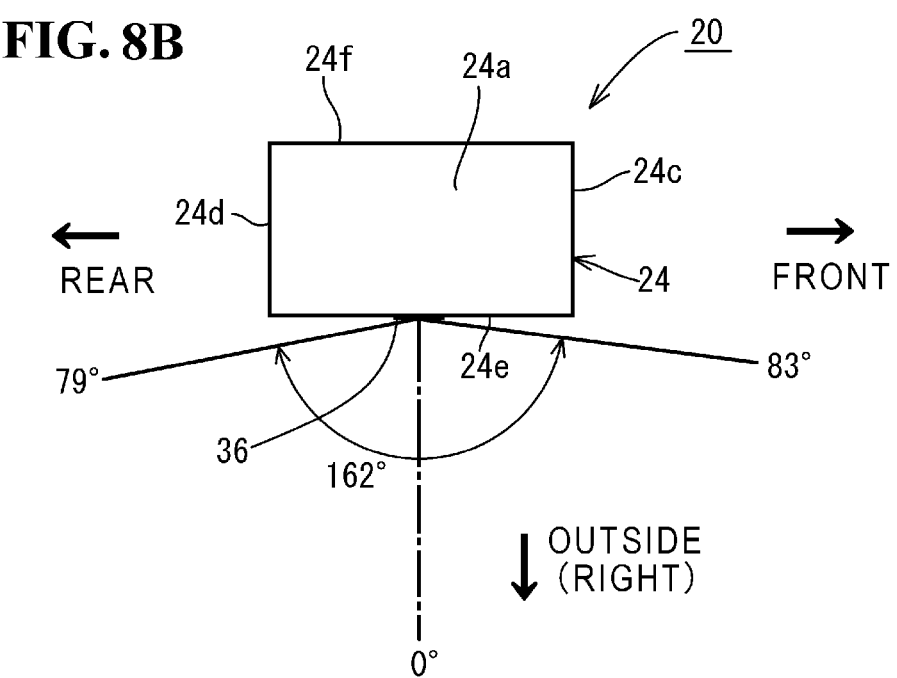
FIG. 8B is a schematic plan view showing an angle range in the horizontal direction in which the window is visible in the arrangement of the vehicle side projection lamp of FIGS. 2A and 2B, if the window is disposed on a side face of the housing.

On the other hand, FIG. 8B schematically shows, as a comparative example, an angle range in the horizontal direction in which the window 36 is visible when the window 36 is disposed on the right side face 24e of the housing 24. In this case, in the front direction of the vehicle, the window 36 is visible in the range of 0 degree to 83 degrees until the window 36 is hidden by the front wheel. In the rear direction of the vehicle, the window 36 is visible in the range of 0 degree to 79 degrees until the window 36 is hidden by the rear wheel. Thus, the window 36 is visible in the total range of 162 degrees in the front and rear directions of the vehicle.

The result is that, according to FIGS. 8A and 8B, when the window 36 is disposed on the corner face 24g, the angle range in the horizontal direction in which the window 36 is visible is narrower than that when the window 36 is disposed on the right side face 24e, which makes it possible to make scattered light or stray light inside the projection unit 20 less likely to be visually recognized by a person around the vehicle.

In addition, as can be understood from, for example, FIG. 5A, since the window 36 is disposed diagonally on the corner face 24g so as to face diagonally rearward right of the vehicle, the window 36 is less likely to receive flying stones from the rear wheel from directly front (straight ahead) thereof when the vehicle moves backward, compared to a case in which the window 36 is disposed on the rear face 24d of the housing 24. That is, even if a flying stone hits the window 36, the impact thereof is mitigated. Thus, it is possible to make the window 36 less likely to be damaged by flying stones from the rear wheel. In addition, it is also possible to make contamination of the window 36 caused by mud splashes from the rear wheel less likely to occur when the vehicle moves backward. In addition, since the window 36 is disposed diagonally on the corner face 24g so as to face diagonally rearward right of the vehicle, the window 36 appears narrower from the rear wheel side than when the window 36 is disposed on the rear face 24d of the housing 24. Thus, flying stones or mud splashes from the rear wheel are less likely to hit the window 36, and it is possible to make damage and contamination of the window caused by flying stones or mud splashes from the rear wheel even less likely to occur.

In the embodiment, as can be understood from FIGS. 5A and 5C, the window 36 of the projection unit 20 is disposed not at a position closest to the vehicle outer wall face (the position at the line L1) on the side lower part of the outer part of the vehicle, but at a position slightly inside the vehicle outer wall face (the position closer to the center in the vehicle width direction). This is to project the image light 16R emitted from the window 36 onto the ground on the lateral side of the vehicle without the image light 16R being blocked by the side step 12 (FIG. 2A) and being largely separated from the vehicle outer wall face. That is, as shown in the schematic view of FIG. 9, if the window 36 is disposed at the position closest to the side step 12 (the position indicated by reference numeral 36'), image light 16R' emitted from the window 36' is largely blocked by the side step 2. In addition, an end P' of the projected image closer to the vehicle outer wall face is largely separated from the vehicle outer wall face. On the other hand, when the window 36 is disposed at the position separated from the vehicle outer wall face on the side lower part of the outer part of the vehicle (the position indicated by reference numeral 36) as in the embodiment, the image light 16R emitted from the window 36 is applied to the ground 18 without being blocked by the side step 12. In addition, the end P of the projected image closer to the vehicle outer wall face can be positioned without a large separation from the vehicle outer wall face.

In the above embodiment, the vehicle side projection lamp is configured to emit image light with the optical axis directed toward the ground diagonally sideward and rearward of the vehicle. However, the vehicle lamp according to the present invention may be configured to emit image light with the optical axis directed diagonally sideward and forward of the vehicle [diagonally forward left of the vehicle (the intermediate direction between leftward and forward) or diagonally forward right of the vehicle (the intermediate direction between rightward and forward)]. For example, in FIG. 2B, when the vehicle side projection lamp 14L for the left side is rotated 180 degrees in the horizontal direction (around the vertical axis) and installed on the right side of the vehicle as the lamp for the right side of the vehicle, the vehicle side projection lamp 14L can emit image light with the optical axis directed toward the ground diagonally forward right of the vehicle and project an image on the right side of the vehicle. Similarly, in FIG. 2B, when the vehicle side projection lamp 14R for the right side is rotated 180 degrees in the horizontal direction (around the vertical axis) and installed on the left side of the vehicle as the lamp for the left side of the vehicle, the vehicle side projection lamp 14R can emit image light with the optical axis directed toward the ground diagonally forward left of the vehicle and project an image on the left side of the vehicle. Also, the vehicle lamp according to the present invention may be configured to emit image light with the optical axis directed sideward of the vehicle (leftward or rightward).

In the above embodiment, the vehicle lamp according to the present invention is installed on the lower face of the side lower part of the outer part of the vehicle. However, the vehicle lamp according to the present invention may be installed on the side face (outer wall face) of the lower part or the lower side face (the face located at the boundary between the lower face and the side face) of the lower part. In the above embodiment, the rear face (emitting-side end face) and the corner face of the housing are discontinuous faces. However, the rear face and the corner face of the housing may be continuous faces [e.g., the rear face (emitting-side end face) and the corner face may be continuous curved faces]. Although, in the above embodiment, the optical path bending mirror is formed of a plate-like mirror, the optical path bending mirror may be formed of a prism.

What is claimed is:

1. A vehicle lamp configured to be installed on a side lower part of an outer part of a vehicle, the vehicle lamp being configured to project image light of visible light onto the ground on a lateral side of the vehicle, the vehicle lamp comprising:
 a housing;
 an optical system housed in the housing, the optical system being configured to generate image light of visible light; and
 a window disposed in a partial area of a wall face of the housing, the window including a transparent plate having a planar outer surface, the transparent plate being configured to transmit the generated image light and emit the generated image light to an external space of the housing,
 wherein
 the optical system includes a lens group configured to generate the image light, an optical path bending mirror configured to bend an optical path of the generated image light, and a concave mirror configured to reflect the image light with the optical path bent and emit the image light to the external space from the window, and
 a positional relationship between the window and the concave mirror is set in such a manner that, in a state in which the vehicle lamp is installed on the side lower part of the outer part of the vehicle in a position that enables the vehicle lamp to project the image light emitted from the window toward the ground on the lateral side of the vehicle, at least a part of the concave mirror in the height direction is positioned higher than the whole of the window in the height direction, and more than half or the whole of the window in the height direction is positioned lower than the concave mirror;
 wherein the window and the concave mirror are positioned on a same side of the housing, and
 a portion of the wall face, which extends vertically above the partial area of the wall face in which the window is disposed, is non-transparent; and
 wherein the housing includes an emitting-side end face facing rearward or forward of the vehicle, a side face facing sideward of the vehicle, and the partial area of the wall face including a corner face located between the emitting-side end face and the side face, the corner face facing diagonally sideward and rearward or diagonally sideward and forward of the vehicle, and the window is disposed on the corner face.

2. The vehicle lamp according to claim 1, wherein the positional relationship between the concave mirror and the window is set in such a manner that, in the state in which the vehicle lamp is installed on the side lower part of the outer part of the vehicle in a position that enables the vehicle lamp to project the image light emitted from the window toward the ground on the lateral side of the vehicle, more than half or the whole of the concave mirror in the height direction is positioned higher than the whole of the window in the height direction.

3. The vehicle lamp according to claim 2, wherein a positional relationship between the window and the wall face is set in such a manner that, in the state in which the vehicle lamp is installed on the side lower part of the outer part of the vehicle in a position that enables the vehicle lamp to project the image light emitted from the window toward the ground on the lateral side of the vehicle, more than half or the whole of the window in the height direction is positioned lower than a central position in the height direction of the wall face where the window is disposed.

4. The vehicle lamp according to claim 1, wherein an area of the window is smaller than an area of a mirror surface of the concave mirror, and the window is disposed at a position where the whole of a ray bundle of the image light reflected by the concave mirror and reduced in beam diameter can pass through the window.

5. The vehicle lamp according to claim 1, wherein, in the state in which the vehicle lamp is installed on the side lower part of the outer part of the vehicle in a position that enables the vehicle lamp to project the image light emitted from the window toward the ground on the lateral side of the vehicle, in plan view, the lens group, the optical path bending mirror, and the concave mirror of the optical system are arranged in a vehicle front-rear direction, and the concave mirror is disposed in a position inclined to the lateral side of the vehicle relative to the vehicle front-rear direction toward the window.

6. The vehicle lamp according to claim 1, wherein
when viewed from the emitting-end face side of the housing,
the optical path bending mirror and the concave mirror are disposed behind the emitting-side end face,
the concave mirror is disposed above the optical path bending mirror, and
an optical axis of the image light reflected by the concave mirror is directed diagonally downward toward the window.

7. The vehicle lamp according to claim 1, further comprising a bracket attached to a lower face of the side lower part of the outer part of the vehicle, wherein
the bracket holds the housing in a position that enables the image light emitted from the window to be projected toward the ground on the lateral side of the vehicle,
the bracket includes a screen face disposed between the housing and a wheel of the vehicle, and
the screen face has a cutout or a hole through which the image light emitted from the window passes toward the ground on the lateral side of the vehicle.

8. The vehicle lamp according to claim 1, further comprising:
a bracket to be attached to a vehicle bottom face, and a projection unit attached to the bracket,
wherein the bracket includes an upper plate to be attached to the vehicle bottom face in a horizontal position, and
the projection unit including the housing, the optical system, and the window,
wherein the positional relationship between the window and the concave mirror is set in such a manner that, in a state in which the projection unit is attached to the bracket and the upper plate of the bracket is in a horizontal position, the at least the part of the concave mirror in the height direction is positioned higher than the whole of the window in the height direction, and more than half or the whole of the window in the height direction is positioned lower than the concave mirror.

* * * * *